United States Patent [19]

Day

[11] 4,291,612

[45] Sep. 29, 1981

[54] POWER BRAKE SYSTEM DIFFERENTIAL AIR PRESSURE CONTROL VALVE ASSEMBLY

[75] Inventor: Edward G. Day, Rochester, N.Y.

[73] Assignee: General Motors Corporation, Detroit, Mich.

[21] Appl. No.: 51,817

[22] Filed: Jun. 25, 1979

[51] Int. Cl.³ .......................................... F01B 21/02
[52] U.S. Cl. ......................................... 91/6; 60/404; 60/415; 91/451; 137/115; 137/116.3
[58] Field of Search ............... 91/6, 415, 417, 448, 91/451; 137/115, 116.3, DIG. 8; 60/290, 307, 404, 415

[56] References Cited

U.S. PATENT DOCUMENTS

| 3,434,388 | 3/1969 | Julow | 91/6 |
|---|---|---|---|
| 3,768,366 | 10/1973 | Grabb | 91/6 |
| 3,818,702 | 6/1974 | Woo | 91/6 |
| 4,174,610 | 11/1979 | Hollis | 60/290 |
| 4,175,387 | 11/1979 | Miura | 60/290 |
| 4,177,642 | 12/1979 | Klimazewski | 60/290 |

Primary Examiner—Abraham Hershkovitz
Attorney, Agent, or Firm—D. D. McGraw

[57] ABSTRACT

A power brake system has a brake booster operable by differential air pressure provided by a source of vacuum and a source of compressed air pressure. The differential air pressure control valve assembly of the invention maintains a substantially constant available differential of air pressure between the vacuum and compressed air pressures available to the brake booster for booster operation. In the charging mode it directs air pressure from an air pressure pump to an accumulator connected to the pressure inlet side of the booster, charging until the desired pressure differential is attained. In the storage mode, the air pressure from the pump is permitted to flow in its usual manner to another device or circuit utilizing the air pressure. This may be, for example, a part of the vehicle engine emission control system. In the pressure relief mode, the control valve vents excess accumulated pressure to exhaust.

2 Claims, 4 Drawing Figures

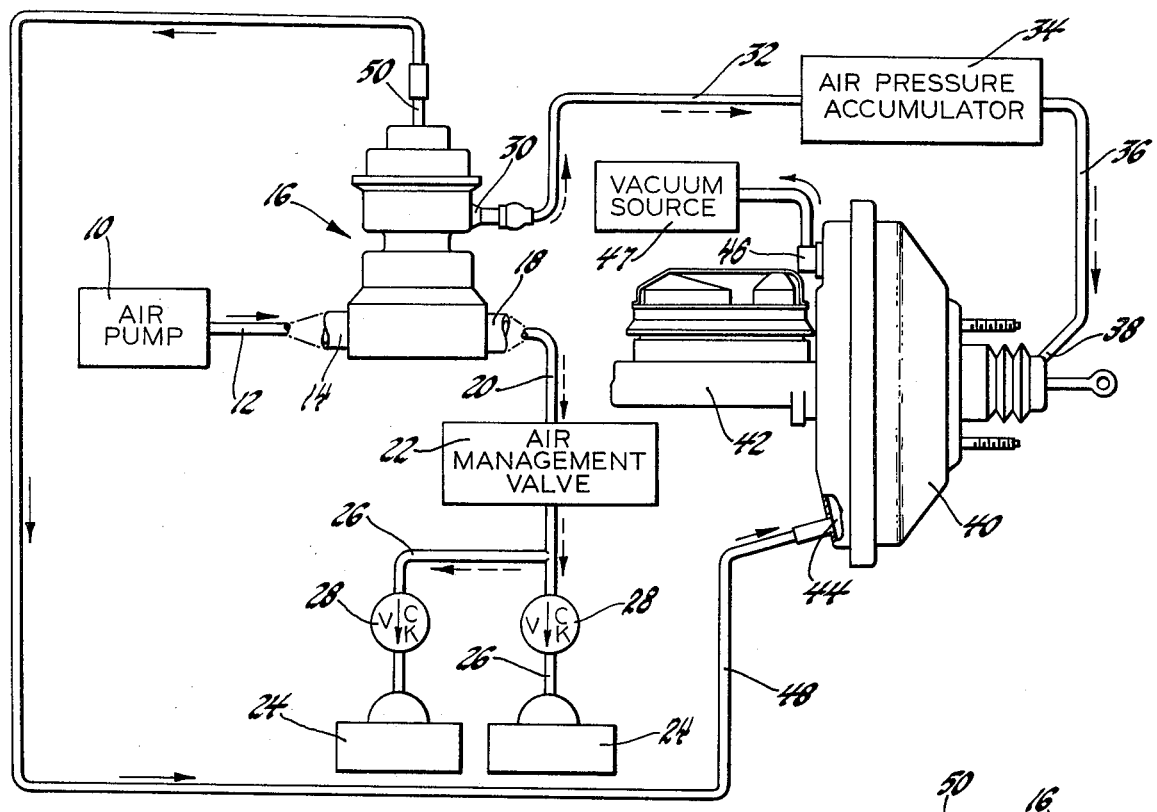
Fig. 1
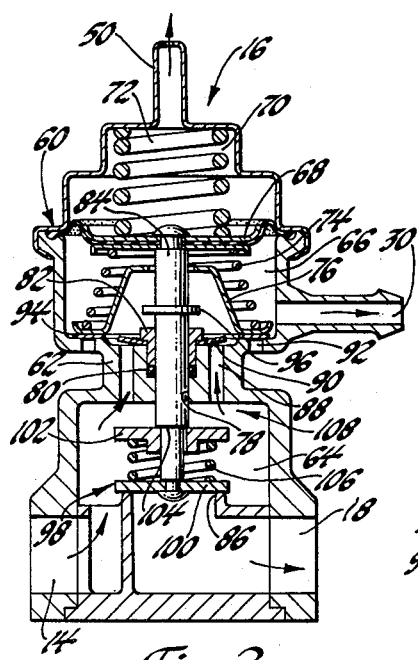
Fig. 2
Fig. 4
Fig. 3

POWER BRAKE SYSTEM DIFFERENTIAL AIR PRESSURE CONTROL VALVE ASSEMBLY

The invention relates to a valve usable in a power brake system to maintain a suitable pressure differential at a power brake booster operated by compressed air pressure and vacuum. The control valve is sensitive to power brake booster reservoir vacuum and receives pressurized air from a pump such as the A.I.R. pump of the vehicle engine emission control system. Such pumps are well known in the art.

In the charging mode the control valve embodying the invention directs compressed air from the pump to a pressurized air accumulator connected with the pressure inlet side of the booster. The accumulator is charged until the desired pressure differential is attained.

In the storage mode the pressurized air from the pump is permitted to flow in its usual manner to the engine emission control system. For example, pressurized air may be introduced into the exhaust ports of the engine to complete combustion of any exhaust gases exiting the engine combustion chambers.

In the pressure relief mode the control valve embodying the invention vents any excess accumulated air pressure to the atmosphere.

One of the objectives of the invention is to maintain an adequate and more uniform supply of differential pressure to the brake booster of the power brake system. When power brakes utilize atmospheric air pressure and subatmospheric pressure from a vacuum source such as the engine intake manifold to provide the pressure differential, the pressure differential value is subject to fluctuation as the engine is varied in its operation, and also as vacuum is used by the booster or other systems utilizing vacuum. It is also modified as the altitude at which the vehicle is operated changes to any great extent because of the change in atmospheric air pressure.

The invention is preferably used in a system already having an air pump installed. Such a system is found in vehicles utilizing an A.I.R. pump that provides compressed air for the engine emission control system.

In the drawing:

FIG. 1 is a schematic representation of a system embodying the invention and having parts broken away and in section.

FIG. 2 is a cross-section view of the control valve of the invention, shown in the charging mode.

FIG. 3 is similar to FIG. 2 and shows the valve in the storage mode.

FIG. 4 is similar to FIGS. 2 and 3 and shows the valve in the pressure relief mode.

The system schematically illustrated in FIG. 1 includes portions of a vehicle power brake system and also portions of a vehicle engine emission control system. The system includes an air pump 10 connected by pump pressure line 12 to the inlet 14 of the air/vacuum brake control valve assembly 16 embodying the invention. The outlet 18 of control valve 16 is connected to the air pressure line 20, which delivers pressurized air to the air management valve 22. The air management valve controls the admission of pressurized air to the engine exhaust ports 24 through suitable lines 26 and check valves 28. The air management valve, the lines 26, check valves 28 and exhaust ports 24 are part of the vehicle engine emission control system and form no part of the invention. The pump 10 of that system is utilized since it is an available source of air pressure when engines have such emission control systems already installed. In systems where no such emission control system is already provided, an air pump may be provided as a source of compressed air specifically for the power brake system. It may also provide air pressure for any other suitable system having a need of air pressure.

The outlet 30 of the control valve 16 is connected by the storage pressure line 32 to the air pressure accumulator 34. The pressure line 36 connects accumulator 34 with the inlet 38 of the power brake booster assembly 40. Therefore, line 36 provides air pressure stored in accumulator 34 to the power brake booster asssembly so that the compressed air is readily available for use when the power brake booster is actuated. The power brake booster assembly 40 has a master cylinder 42 attached thereto which is operated to supply hydraulic pressure to the vehicle brakes as needed. The power brake booster asssembly 40 has a vacuum chamber 44 which is connected through a vacuum check valve 46 to a vacuum source 47, which may be the intake manifold of the vehicle engine. Vacuum chamber 44 acts as a vacuum reservoir for the power brake booster assembly. A vacuum line 48 is connected to the vacuum connection 50 of the control valve 16 and to vacuum chamber 44 so that vacuum pressure from the power brake booster chamber 44 is provided to the control valve 16.

Control valve 16 is illustrated in greater detail in FIGS. 2, 3 and 4. The valve asssembly 16 has a housing 60 of which inlet 14, outlet 18, outlet 30 and vacuum connection 50 are parts. The housing includes a wall 62 separating portions of the housing to define a first chamber 64 on one side of the wall and a second chamber 66 on the other side of the wall. A movable power wall 68, shown as a diaphragm covering one side of second chamber 66, further divides the housing to also provide a third chamber 70. Vacuum connection 50 opens into third chamber 70. A spring 72 is contained in that chamber and acts on power wall 68 to urge the power wall toward the housing wall 62. Another spring 74 is contained in second chamber 66 and has one end acting on power wall 68 in opposition to spring 72. The other end of spring 74 acts against a valve support and spring seat member 76.

A bore 78 formed through wall 62 has a seal 80 and a retainer and guide 82. A valve stem 84 is attached at one end to power wall 68 and extends through the retainer and guide 82, seal 80, and bore 78 into the first chamber 64. Inlet 14 opens directly into first chamber 64.

First port means 86 formed in housing 60 communicates first chamber 64 with outlet 18 and also defines a valve seat. Second port means 88, illustrated as a plurality of passages, extend through wall 62 and join first chamber 64 and second chamber 66. Check valve means 90 is illustrated as a flexible disc mounted over the ends of the second port means 88 at the bottom of the second chamber 66. Valve means 90 is held in place by the retainer and guide 82 and provides for control of the flow of air through the second port means 88. It can be seen that the valve means 90 will permit air flow from the first chamber 66 when there is sufficient pressure differential to lift the check valve means 90, but will close the port means 88 when air flow is attempted from the second chamber 66 to the first chamber 64 through the port means 88.

Third port means 92, illustrated as passages in the housing 60, communicate the second chamber 66 with atmospheric air, usually referred to as exhaust. Normally closed pressure relief valve means 94 is located within second chamber 66 and is preferably provided on a flange formed as a part of the valve support and spring seat member 76 so as to be aligned with the third port means 92. Therefore springs 72 and 74 urge the valve means 94 to maintain port means 92 normally closed. The valve support and spring seat member 76 may be lifted away from the port means 92 against the force of spring 74, moving relative to housing 60 when the valve stem 84 is moved upwardly sufficiently to engage the pressure relief valve opening means 96, formed on valve stem 84, with a portion of the valve support and spring seat member 76 to move that member upwardly. When valve means 94 is so moved away from port means 92, second chamber 66 is connected to atmosphere.

A first charging valve 98 is formed by the valve seat defined by first port means 86 and the first valve member 100. First valve member 100 is mounted on the opposite end of valve stem 84 from power wall 68 and is contained within the first chamber 64. It normally engages the valve seat formed by port means 86 and therefore normally maintains the connection between chamber 64 and outlet 86 closed until valve stem 84 is moved upwardly sufficiently to open the charging valve 98. A second valve member 102 is received about the lower portion of valve stem 84 adjacent to but spaced from the first valve member 100. The second valve member 102 is slidable for a limited distance on the valve stem 84, and normally abuts a shoulder 104 formed on the valve stem. A spring 106 acting on the first valve member 100 and the second valve member 102 normally urges the second valve member toward engagement with shoulder 104. Second valve member 102 is so arranged that, upon sufficient upward movement of valve stem 84, it will close the second port means 88 and therefore prevent a fluid connection between the first chamber 64 and the second chamber 66 irrespective of action of the check valve means 90. The second valve member 102 and the entrance of the second port means 88 therefore cooperate to define a second charging valve 108. When second charging valve 108 is closed, the first charging valve 98 is opened.

When the vehicle is operating normally, air pump 10 is being driven by the vehicle engine and vacuum from the vacuum source 47 is provided in the power brake booster vacuum chamber 44 and vacuum line 48. Vacuum is therefore also found in the third chamber 70 of the valve assembly 16. Assuming that the accumulator 34 must be charged with air pressure, the valve assembly 16 is placed in the charging mode shown in FIG. 2. In this mode, the first charging valve 98 is closed, the second charging valve 108 is open, and the movable power wall 68 is in the lower position illustrated in FIG. 2. Air pressure from air pump 10 is transmitted through pump pressure line 12 and inlet 14 into first chamber 64. Since charging valve 98 is closed, the air is then directed through the open second charging valve 108 and through port means 88 to open check valve means 90. The air pressure therefore enters the second chamber 66 and passes from that chamber through outlet 30 and storage pressure line 32 to the air pressure accumulator 34 charging that accumulator. When the pressure differential acting across the movable power wall 68 is sufficient, with the aid of the relatively light spring 74, to overcome the spring bias of spring 72, the movable wall 68 moves the valve stem 84 upwardly. This opens the first charging valve 98, and continued upward movement closes the second charging valve 108. This changes the valve assembly 16 to the storage mode illustrated in FIG. 3. In this condition, with the first charging valve 98 open and the second charging valve 108 closed, air pressure from the air pump passes through inlet 14 and the first chamber 64, through the first charging valve 98 and out outlet 18. The air then proceeds to the engine emission control system or any other suitable system utilizing the air pressure. Valve stem 84 is not moved sufficiently upward to engage the valve opening means 96 with the valve support and spring seat member 76, and therefore the valve means 94 maintains the third port means 92 closed. The desired storage pressure is thus maintained in the accumulator 34 as well as in second chamber 66, and is present at inlet 38 of the power brake booster assembly 40. The valve assembly will remain in this position until either the brakes are deployed and the stored air pressure is depleted below a desired minimum, at which time the differential pressure acting on movable power wall 68 will fall below the desired value and the valve will return to the charging mode; or partial closing of the engine throttle valve occurs which increases intake manifold vacuum, thereby increasing the differential pressure acting across power wall 68 to the point where further movement of the power wall and the valve stem 84 will cause the valve assembly to shift to the pressure relief mode shown in FIG. 4. This is accomplished when the power wall 84 moves further upwardly against the force of spring 72 until the pressure relief opening means 96 engages the valve support and spring seat member 76 to lift the pressure relief valve means 94 away from the third port means 92. In this mode air from the accumulator 34 is relieved and decreased to an extent that assures that the power brake booster assembly differential pressure does not exceed the desired operating limit. When sufficient pressure has been relieved from accumulator 34, valve assembly 16 will then return to the pressure storage mode shown in FIG. 3.

A valve has therefore been provided in a differential pressure brake system which will maintain a suitable pressure differential at the booster by use of compressed air and vacuum. The control valve is sensitive to the booster reservoir vacuum as well as pressurized air from an air pump. When the compressed air in the accumulator supplying compressed air to the power brake booster assembly is insufficient to maintain the desired pressure differential at the power brake booster assembly, the valve shifts to a charging mode until the accumulator is again charged to the desired air pressure. The valve maintains the air pressure by shifting to a storage mode, permitting the air pump to deliver air under pressure in its usual manner to another system or systems utilizing the air pressure. In the pressure relief mode, the valve assembly vents any excess accumulated pressure to the atmosphere.

The embodiments of the invention in which an exclusive property or privilege is claimed are defined as follows:

1. In a power brake system having a brake booster operable by differential air pressure provided by a source of vacuum and a source of compressed air pressure, a differential air pressure control valve assembly maintaining a substantially constant available differential of air pressure between the vacuum and the compressed air pressures available to the brake booster for booster power operation, said control valve assembly comprising:

a housing having first, second and third chambers respectively having therein compressed air pressure from said source, compressed air pressure for booster operation and vacuum for booster operation; a movable power wall defining a common wall between said second and third chambers, valve port means connecting said first and second chambers, and valve means responsive to movements of said movable power wall in response to changing pressure differentials thereacross for controlling the compressed air pressure in said second chamber to maintain a substantially constant pressure differential across said power wall and thus establish a substantially constant available differential of air pressure to the brake booster for booster power operation, said valve means accomplishing said controlling by selectively holding compressed air pressure in said second chamber when the pressure differential across said power wall is at the desired substantially constant pressure differential, and either admitting compressed air from said first chamber through said valve port means to said second chamber when the pressure differential across the said power wall is less than the desired substantially constant pressure differential, or discharging compressed air from said second chamber to atmosphere when the pressure differential across said power wall is greater than the desired substantially constant pressure differential, so as to reestablish and maintain said desired substantially constant pressure differential.

2. In a power brake system having a brake booster operable by differential air pressure provided by a source of vacuum and a source of compressed air pressure, a differential air pressure control valve assembly maintaining a substantially constant available differential of air pressure between the vacuum and compressed air pressures available to the brake booster for booster power operation, said control valve assembly comprising:

a housing having
  a first chamber provided with an inlet for receiving compressed air pressure from said source of same and an outlet for compressed air pressure in said first chamber,
  a second chamber for booster operable compressed air pressure and provided with an outlet operatively connected to said brake booster to provide compressed air pressure thereto for booster operation,
  a third chamber connected with said brake booster for receiving booster operable vacuum pressure therefrom,
  first port means forming a part of said first chamber outlet,
  second port means in said housing interconnecting said first and second chambers,
  and third port means connecting said second chamber to atmosphere,
check valve means mounted in said housing and controlling said second port means and permitting air flow only from said first chamber to said second chamber through said second port means;
normally closed pressure relief valve means controllably opening said third port means to controllably vent said second chamber to atmosphere and decrease the pressure therein when said pressure relief valve means is opened;
a movable power wall mounted in said housing and forming a common wall fluidly separating said second and third chambers, said wall being acted on by pressures in said second and third chambers, and having opposed springs also acting thereon with one of said opposed springs urging said power wall towards said second chamber and the other of said opposed springs urging said power wall towards said third chamber, said other spring also acting on said pressure relief valve means and urging the same closed, said one spring exerting a greater force on said power wall than said other spring;
a valve stem secured to said movable power wall and extending through said second chamber and into said first chamber and movable with and under the influence of said power wall;
a first valve member on said valve stem cooperating with said first port means to define a first charging valve when closed preventing compressed air flow from said first chamber through said first port means to said first chamber outlet;
a second valve member on said valve stem in said first chamber and cooperating with said second port means to define a second charging valve which is open when said first charging valve is closed and which is closed by movement of said valve stem by said power wall towards said third chamber when such movement opens said first charging valve;
pressure relief valve opening means on said stem and acting on said pressure relief valve means to open said pressure relief valve means by further movement of said valve stem by said power wall towards said third chamber after said second charging valve is closed, decreasing the air pressure in said second chamber and therefore the air pressure supplied to said brake booster for booster operation;
movement of said valve stem by said movable power wall to operate said valves and valve means acting to maintain a substantially constant pressure differential between the vacuum in said third chamber and the compressed air pressure in said second chamber, that differential pressure being the differential pressure available to the brake booster for booster operation.

* * * * *